United States Patent
Lopez et al.

(10) Patent No.: US 8,573,271 B2
(45) Date of Patent: Nov. 5, 2013

(54) TYRE WITH SELF-SEALING LAYER

(75) Inventors: José Merino Lopez, Riom (FR); Michel Ahouanto, Enval (FR); Pierre Lesage, Clermont-Ferrand (FR); Frédéric Pialot, Moissat (FR)

(73) Assignees: Compagnie Generale des Etablisements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 539 days.

(21) Appl. No.: 12/666,413

(22) PCT Filed: Jun. 19, 2008

(86) PCT No.: PCT/EP2008/057795
§ 371 (c)(1),
(2), (4) Date: Jun. 1, 2010

(87) PCT Pub. No.: WO2009/000742
PCT Pub. Date: Dec. 31, 2008

(65) Prior Publication Data
US 2010/0300593 A1 Dec. 2, 2010

(30) Foreign Application Priority Data
Jun. 28, 2007 (FR) ..................................... 07 04638

(51) Int. Cl.
*B60C 5/14* (2006.01)
*B60C 19/12* (2006.01)

(52) U.S. Cl.
USPC ........................................ 152/502; 152/504

(58) Field of Classification Search
USPC .................................................. 152/502–507
See application file for complete search history.

(56) References Cited

U.S. PATENT DOCUMENTS

| | | |
|---|---|---|
| 1,373,834 A | 4/1921 | Rogers |
| 3,000,615 A | 9/1961 | Alm |

(Continued)

FOREIGN PATENT DOCUMENTS

| | | |
|---|---|---|
| EP | 0 102 844 A2 | 3/1984 |
| EP | 1 034 948 A2 | 9/2000 |

(Continued)

OTHER PUBLICATIONS

Holde, G. Thermoplastic Elasomers. Kirk-Othmer Encyclopedia of Chemical Technology. May 2002.*

*Primary Examiner* — Justin Fischer
*Assistant Examiner* — Robert Dye
(74) *Attorney, Agent, or Firm* — Fitzpatrick, Cella, Harper & Scinto

(57) ABSTRACT

Tubeless tire in the form of a torus open radially inwards with an outer wall and an inner wall, characterized in that at least part of the inner wall is covered with a self-sealing layer comprising a thermoplastic styrene (TPS) elastomer having a Shore 0 hardness of less than 35.

18 Claims, 6 Drawing Sheets

(56) References Cited

U.S. PATENT DOCUMENTS

| | | | |
|---|---|---|---|
| 4,228,839 A * | 10/1980 | Bohm et al. | 152/504 |
| 4,359,078 A | 11/1982 | Egan | 152/347 |
| 4,424,295 A | 1/1984 | Van Ornum et al. | 524/526 |
| 4,426,468 A | 1/1984 | Ornum et al. | 523/166 |
| 5,236,030 A * | 8/1993 | Misawa et al. | 152/510 |
| 5,618,882 A * | 4/1997 | Hammond et al. | 525/92 D |
| 2003/0150544 A1 | 8/2003 | Naito et al. | 156/115 |
| 2008/0264538 A1 | 10/2008 | Merino-Lopez | 152/339.1 |
| 2008/0264539 A1 | 10/2008 | Merino-Lopez et al. | 152/341.1 |

FOREIGN PATENT DOCUMENTS

| | | |
|---|---|---|
| EP | 1 798 257 A1 | 6/2007 |
| GB | 09472 | 0/1898 |
| JP | 05-169907 * | 7/1993 |
| JP | 2001-018609 A | 1/2001 |
| WO | WO 99/62998 A1 | 12/1999 |

* cited by examiner

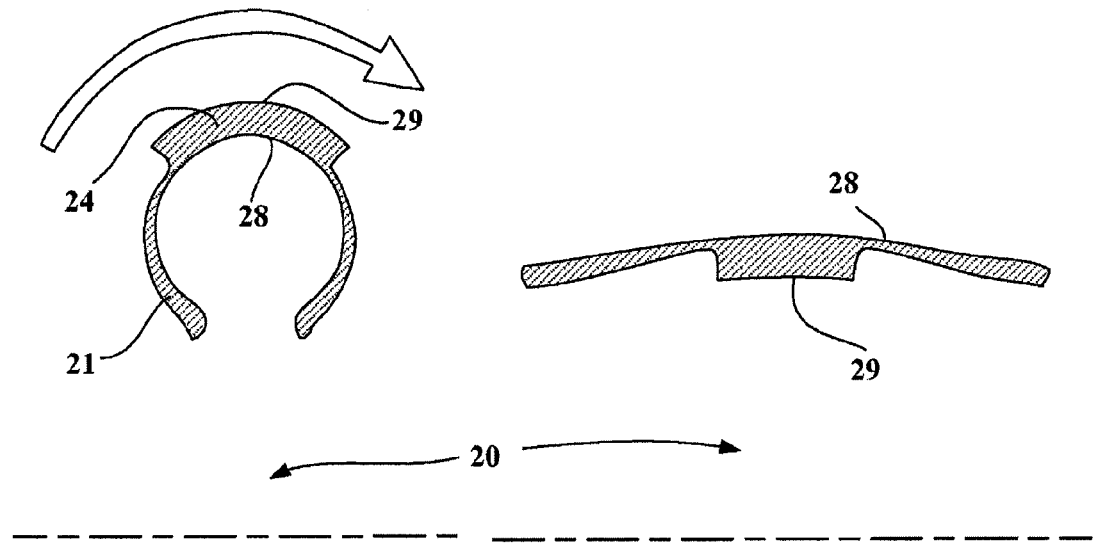
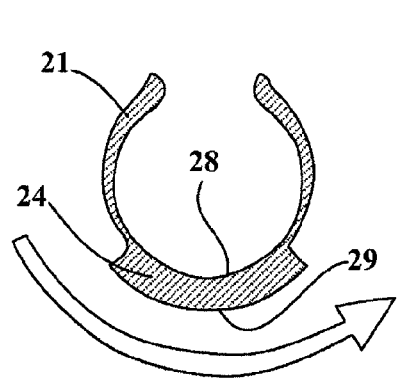
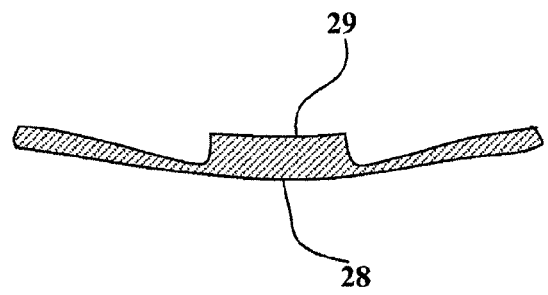
Fig. 7          Fig. 8

TYRE WITH SELF-SEALING LAYER

FIELD OF THE INVENTION

The present invention relates to a tubeless tyre that includes a self-sealing layer placed on its inner wall so as to seal off any perforations in service.

TECHNOLOGICAL BACKGROUND

The problem of punctures, namely the problem of how to enable a vehicle to continue its travel despite a substantial or complete loss of pressure of one or more of its tyres or how to avoid a loss of air following a perforation, dates back from the very start of the use of wheels fitted with inflated tyres.

One solution very often proposed is to add a self-sealing layer to the inner wall of the tyre.

To be usable, such a self-sealing layer must meet many conditions of a physical and chemical nature. In particular, it must be effective over a very wide range of operating temperatures, throughout the lifetime of the tyres. It must be capable of sealing off perforations or holes when the responsible perforating object, which we will call a "nail", remains in place. After the nail has been removed, the self-sealing layer must be able to fill up the hole. It is preferable for the material of the self-sealing layer not to pass completely through the wall of the tyre so as to form a protrusion or "plug" on the outside. These plugs are effective for avoiding leaks, but if for any reason they are cut off, the leak may no longer be sealed off.

Document U.S. Pat. No. 4,426,468 presents self-sealing layers for tyres, based on a crosslinked high-molecular-weight butyl rubber, the formulation of which is adjusted so as to meet given values of the stress at break, elongation at break and crosslinking density characteristics and thus, in particular, to prevent the material of the self-sealing layer from passing through the wall of the tyre into the hole left after the nail has been removed.

Document EP 1 090 069 B1 discloses a self-sealing composition with 100 parts by weight of a styrene-based thermoplastic elastomer, 110 to 190 parts by weight of an adhesive, 80 to 140 parts by weight of a liquid plasticizer and 2 to 20 parts by weight of an additive. That document provides no information regarding the physical characteristics of the compositions.

DESCRIPTION OF THE INVENTION

One subject of the invention is a tubeless tyre in the form of a torus open radially inwards with an outer wall and an inner wall, characterized in that at least part of the inner wall is covered with a self-sealing layer comprising a thermoplastic styrene (TPS) elastomer having a Shore 0 hardness of less than 35.

Advantageously, the self-sealing layer has a Shore 0 hardness of less than 20 and more preferably less than 10.

Another subject of the invention is a similar tyre such that the self-sealing layer has a dynamic modulus G* of less than 0.01 MPa, G* being measured at a frequency of 10 Hz and a temperature of 60° C.

The Applicants have found that, contrary to what is indicated in the documents of the prior art, the use of a very soft self-sealing layer comprising a thermoplastic styrene elastomer is not only possible but provides excellent puncture-sealing properties, particularly after removal or extraction of the nail responsible for the puncture.

In certain applications, it is advantageous to cover, on the side facing the internal cavity, the self-sealing layer with a film. This film makes it possible to substantially limit the tendency of the material of the self-sealing layer to pass through the wall of the tyre after removal of a nail. The presence of this film permits the use of self-sealing materials with a hardness lower than that of the materials recommended in the documents of the prior art without impairing the effectiveness in the event of a puncture. This film is preferably a thermoplastic film and more preferably an extensible film.

Advantageously, the thickness of the thermoplastic film is less than 100 µm and preferably between 5 and 50 µm depending on the type of tyre.

This very small thickness of the thermoplastic film gives it a negligible weight and very great flexibility. Such a thermoplastic film may be a polypropylene (PP) film.

The extensible thermoplastic film may be chosen from the group comprising polyethylene (PE) film, polyvinyl chloride (PVC) film and polyvinylidene chloride (PVDC) film. The films made of these three materials are very widely used as stretch films in both professional and domestic applications.

Advantageously, the self-sealing layer has a thickness of greater than 0.3 mm and preferably between 0.5 and 10 mm depending on the application. The thickness of this layer depends on the type of tyre in question. For a vehicle of the heavy-goods or agricultural type, this thickness may be between 2 and 5 mm. For tyres used in civil engineering vehicles, the thickness may be between 2 and 10 mm. For passenger vehicles, this thickness may be between 0.5 and 4 mm. Finally, for cycle tyres, the thickness may be between 0.4 and 2 mm and preferably around 1 mm.

Advantageously, the TPS is the predominant elastomer of the self-sealing layer.

TPS elastomers have the advantage of being able to accept very high contents of extender oils and also have excellent extensibility and tensile strength properties, and thus the resulting elastomer compositions may have mechanical properties suitable for the application of sealing of holes.

Advantageously, the TPS elastomer is chosen from the group consisting of styrene/butadiene/styrene (SBS), styrene/isoprene/styrene (SIS), styrene/isoprene/butadiene/styrene (SIBS), styrene/ethylene-butylene/styrene (SEBS), styrene/ethylene-propylene/styrene (SEPS), styrene/ethylene-ethylene-propylene/styrene (SEEPS) block copolymers and blends of these copolymers.

Preferably, the TPS elastomer is chosen from the group consisting of SEBS copolymers, SEPS copolymers and blends of these copolymers.

Advantageously, the self-sealing layer includes an extender oil in an amount of greater than 200 phr (parts by weight per hundred parts of rubber or elastomer).

This extender oil may be chosen from the group consisting of polyolefinic oils, paraffinic oils, naphthenic oils, aromatic oils, mineral oils and mixtures of these oils.

Preferably, the extender oil is a polyisobutylene oil with a content between 500 and 900 phr.

In the tyres according to the invention, the self-sealing layer may be placed on their crown, and it may extend as far as the equators, or from one sidewall to the other, at least as far as a radial position corresponding approximately to the edge of the rim flange when the tyre is in the mounted position. The extent of the self-sealing layer or the self-sealing laminate made up of the self-sealing layer and the extensible thermoplastic film depends on the risks of the tyres in question puncturing but also on the compromise between these risks and the weight of said tyres.

Another subject of the invention is a method of applying a self-sealing laminate to the inner wall of a tubeless cycle tyre, in which:

the tyre is turned inside-out so as to bring the inner wall to the outside of the torus and the outer wall to the inside of the torus;

the outer torus wall of the tyre is extended;

the self-sealing means are applied to the inner wall of the tyre; and the tyre is turned inside-out so as to return the inner and outer walls to their initial positions.

The self-sealing layer is thus very advantageously in a compressive stress state, which contributes to the self-sealing operation.

Other features and advantages of the invention will become apparent from the following description, given with reference to the appended drawings which show, by way of non-limiting examples, embodiments of the invention.

BRIEF DESCRIPTION OF THE DRAWINGS

All the embodiment details are given in the following description, which is supplemented by FIGS. 1 to 14 in which:

FIG. 7 shows the first step of applying a self-sealing layer to a cycle tyre;

FIG. 8 illustrates a cycle tyre after being turned inside out;

DETAILED DESCRIPTION OF THE INVENTION

The Shore 0 hardness values are obtained in accordance with the ASTM D 2240 standard. The measurements are carried out 10 seconds after application of the indenter.

The dynamic properties of the elastomer materials are obtained using an RPA 2000 rheometer from the company Alpha Technologies. The specimens are placed in a chamber between two striated biconical plates. After closure, the volume of the chamber is around 4.5 cm$^3$. One of the plates is fixed, the other oscillating sinusoidally about its centre. A deformation of around 20% is imposed and a frequency scan carried out between 0.03 Hz and 33 Hz. The imposed temperature inside the chamber is 60° C. The results exploited are the dynamic shear modulus G* and the loss factor tan δ, where:

$$G^* = \sqrt{G'^2 + G''^2} \text{ and } \tan \delta = G''/G'$$

G*: dynamic shear modulus in MPa;
G': real shear modulus in MPa;
G": loss modulus in MPa; and
δ: phase shift between the imposed deformation and the measured stress.

The dynamic modulus and the Shore 0 hardness are two methods for the mechanical characterization of elastomer materials. Their results are correlated but are not identical, in particular in the case of materials of very low rigidity. These two methods are particularly well suited for characterizing materials of very low rigidity, such as those of the self-sealing layers described in this document.

The extension modulus of a material is understood to mean the apparent secant extension modulus obtained for a given uniaxial extension deformation ε, at first elongation (i.e. without an accommodating cycle), measured at 23° C.; the pull rate is 500 mm·min$^{-1}$ (ASTM D412 standard). This modulus is called the modulus E:

$$E = \frac{\sigma}{\varepsilon} = \frac{F}{S_0 \varepsilon};$$

where $S_0$ is the initial cross section of the test piece, F is the extension force measured at the deformation in question and σ=F/$S_0$, the extension stress at the deformation in question divided by the initial cross section $S_0$ of the test piece.

The terms $\sigma_B$ and $\epsilon_B$ are understood to mean the measured stress and elongation at break of the test pieces of material ($\sigma_B$ being normalized to the initial cross section $S_0$ of the test piece).

Figure 1:
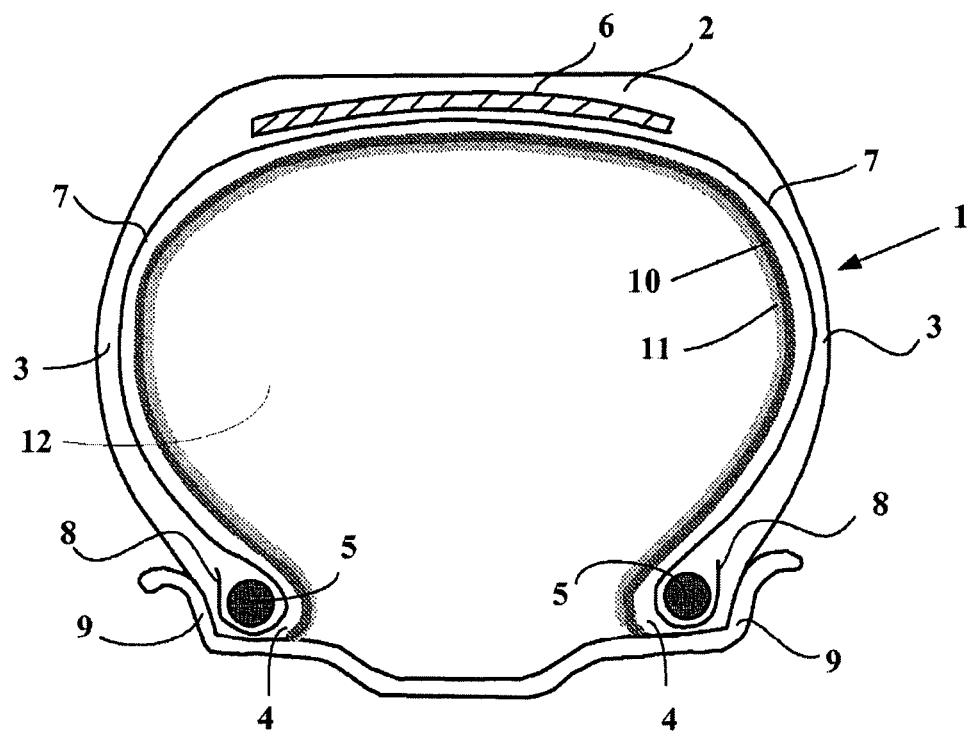
FIG. 1 shows schematically a radial cross section of a tyre incorporating a self-sealing layer according to the invention.

FIG. 1 shows schematically a radial cross section of a pneumatic tyre, or tyre, for a passenger vehicle incorporating a self-sealing layer according to the invention.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread (not shown in this schematic figure). A carcass reinforcement 7 is wound around the two bead wires 5 in each bead 4, the upturn 8 of this reinforcement 7 lying for example towards the outside of the tyre 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the rotation axis of the tyre. An airtight layer 10 extends from one bead to the other radially to the inside relative to the carcass reinforcement 7.

The tyre 1 is characterized in that its inner wall includes a self-sealing layer 11. In accordance with one embodiment of the invention, the self-sealing layer 11 covers the entire airtight layer 10 and constitutes substantially the entire inner wall of the tyre. The self-sealing layer may also extend from one sidewall to the other, at least from a radial height corresponding to the ends of the rim flanges when the pneumatic tyre is in the fitted position. According to other preferred embodiments, the self-sealing layer 11 could cover only a portion of the airtight layer (layer 10), for example only the crown zone of the tyre, or could extend at least from the crown zone to mid-points of the sidewalls (the equators) of the tyre.

The airtight layer (with a thickness of 0.7 to 0.8 mm) is based on butyl rubber having a conventional formulation for an inner liner, which usually defines, in a conventional tyre, the radially internal face of the tyre intended to protect the carcass reinforcement from diffusion of air coming from the internal space of the tyre. This airtight layer 10 therefore enables the tyre 1 to be inflated and kept under pressure. Its sealing properties enable it to guarantee a relatively low rate of pressure drop, making it possible to keep the tyre inflated, in the normal operating state, for a sufficient time, normally several weeks or several months.

Figure 2:
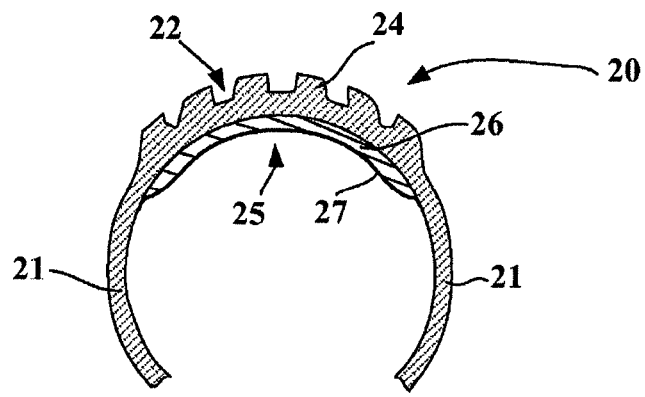
FIG. 2 shows a partial radial cross section of a cycle tyre incorporating a self-sealing laminate according to the invention.

FIG. 2 illustrates a cycle tyre that includes a self-sealing laminate according to the invention.

This tyre 20 comprises two sidewalls 21 and a crown 22. A carcass reinforcement (not shown) extends from one bead to the other in the sidewalls and the crown. A tread 24 is placed on the carcass reinforcement at the crown. This tyre includes a self-sealing laminate 25 according to the invention. This laminate 25 consists of a self-sealing layer 26 similar to that of the tyre 1 covered with an extensible thermoplastic film 27. The extensible thermoplastic film is in contact with the air of the internal cavity of the tyre. The laminate 25 extends substantially only around the crown 22 of the tyre 20.

Figure 3:
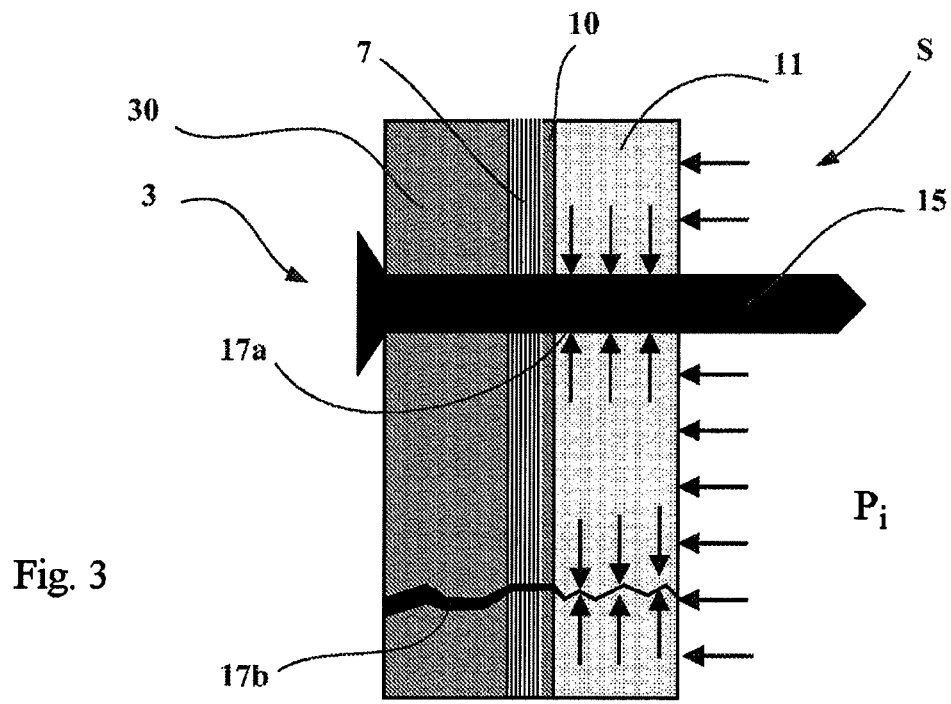
FIGS. 3 and 4 show schematically the sealing mechanisms of the self-sealing layers according to the invention in the presence of a puncturing object and after its removal.
Figure 4:
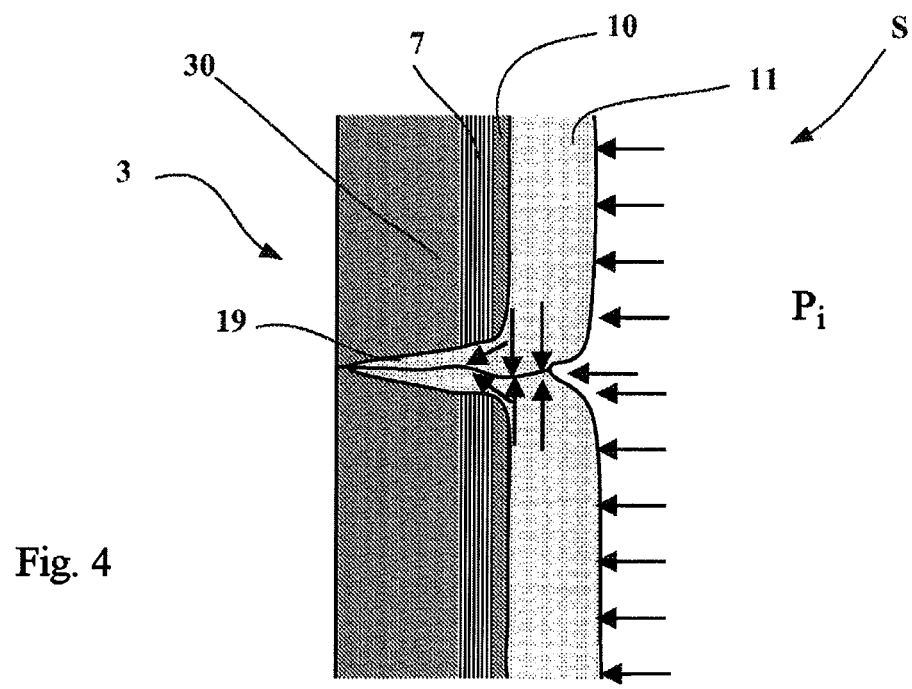

FIGS. 3 and 4 illustrate highly schematically the sealing mechanisms of the self-sealing layers according to the invention in the presence of a puncturing object and after its removal. These two figures show an enlarged part of a portion S of a sidewall 3 of the tyre 1.

In FIG. 3, a puncturing object 15 has passed completely through the sidewall 3 of the tyre, creating the crack 17a. The puncturing object or nail remains in place and the arrows indicate the direction of the stresses created by the inflation pressure $P_i$ in the internal cavity 12 of the tyre 1. This inflation pressure $P_i$ places the self-sealing layer in a state of hydrostatic compression which is more perfect the lower its elastic extension modulus or the lower its dynamic shear modulus. These forces apply the material of the self-sealing layer against the puncturing object 15 and seal off the crack 17a.

The same FIG. 3 shows the crack 17b after removal of the nail 15 when the two lips of the crack in the material 30 of the sidewall 3 and the other layers of materials are very close together. In such a case, the same hydrostatic compressive forces ensure closure of the lips of the crack 17b in the self-sealing layer and thus seal off this crack 17b.

It should be noted that when the nail remains in place, the airtight layer 10 enables the leak rate through the crack 17a to be very greatly limited. However, when the nail is removed, this airtight layer is absolutely incapable of sealing off the crack 17b and the tyre goes flat often virtually instantaneously.

FIG. 4 shows the case in which, after the puncturing object has been removed, the lips of the crack created in the structure of the tyre sidewall 3 are moved substantially apart and leave a true hole of finite dimension. Such a hole may commonly have a diameter of several mm. In this case, the driving force for sealing off such a crack 17b is again the hydrostatic pressure generated in the self-sealing layer by the inflation pressure $P_i$. These forces result in a displacement in the crack so as to fill it with the material of the self-sealing layer close to the crack. This results in excellent sealing of the crack.

This displacement is easier the lower both the dynamic modulus and/or the Shore 0 hardness of the material of the self-sealing layer. These displacements thus require the materials of the self-sealing layer to have a high elongation at break combined with a high stress at break so as to be able to fill the cracks without breaking. An elongation at break of greater than 500% and preferably greater than 800% combined with a stress at break of greater than 0.2 MPa in the case of the materials according to the invention are satisfactory.

The self-sealing layers according to the invention behave mechanically in a very similar way to an elastic material. This behaviour gives them a substantial advantage over the usual self-sealing layers with a much more viscous mechanical behaviour. This advantage is demonstrated when a puncturing object is removed, especially when this puncturing object has remained in place for several hours or even several days and even longer. In such a case, the material of the usual self-sealing layer has largely had time to completely relax all around the puncturing object, and its viscosity opposes the hydrostatic compressive forces that tend to make the material flow into the crack created by the removal. This may result, especially if its adhesion or tack to the puncturing object has decreased, in a lack of sealing for a relatively long time. This lack of sealing is very readily audible when the puncturing object is removed.

In contrast, the self-sealing layers according to the invention behave in a practically purely elastic manner, and during removal, through the action of the hydrostatic compressive forces, their response is virtually instantaneous. This sealing defect is no longer observed.

Figure 5:
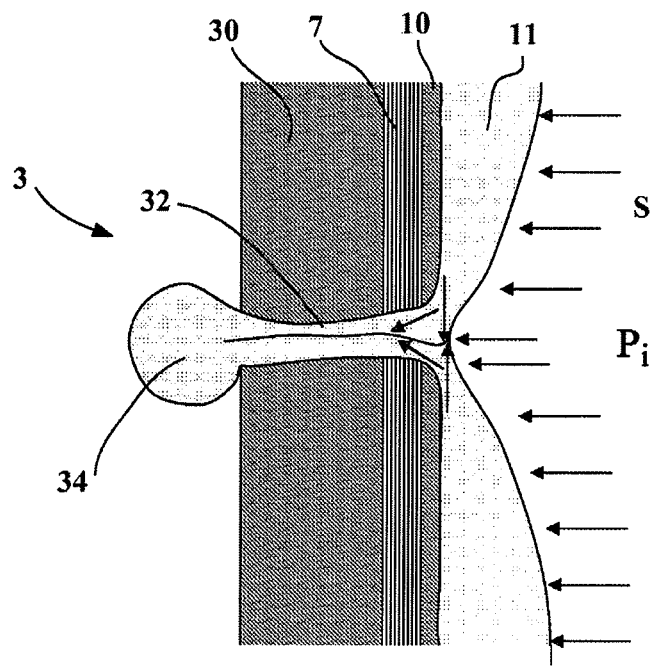
FIGS. 5 and 6 show schematically the sealing mechanisms of the self-sealing laminates according to the invention after the removal of a puncturing object or nail.
Figure 6:
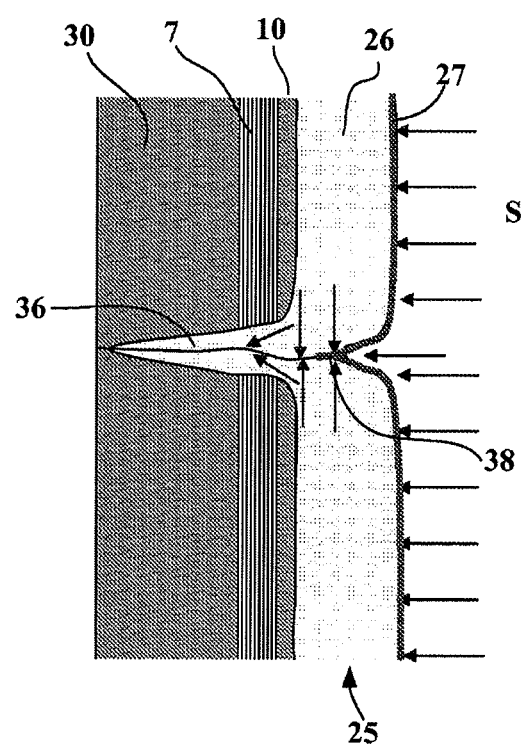
Figure 9:
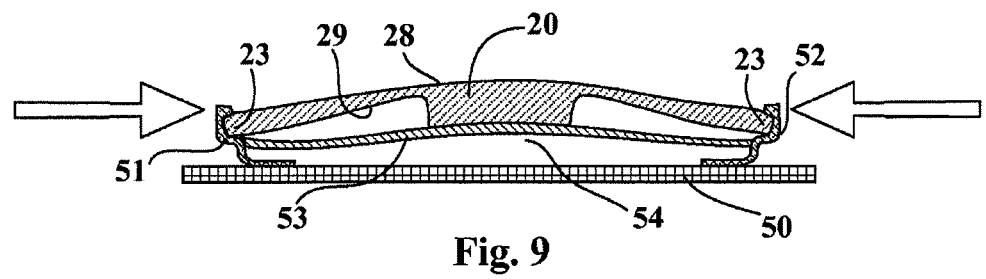
FIG. 9 illustrates an inside-out cycle tyre placed on an inflation drum.

FIGS. 5 and 6 illustrate very schematically the sealing mechanisms of the self-sealing layer and self-sealing laminate in accordance with the invention after removal of a puncturing object. These two figures again show an enlarged part of a portion S of a sidewall 3 of a tyre similar to that shown in FIG. 1.

FIG. 5 illustrates the mechanism whereby a plug 34 is formed upon removal of a puncturing object in the absence of an extensible thermoplastic film. The crack 32 has a size such that the material of the self-sealing layer 11, pushed by the inflation pressure $P_i$, passes right through the sidewall 3, forming a protrusion or plug on the outside. This plug usually seals off the leak satisfactorily, but it is very exposed to the outside of the tyre and when it is torn the tyre is liable to go progressively or instantly flat. Another consequence of a plug being formed is that the amount of material of the self-sealing layer inside the tyre is reduced, thereby impairing the efficiency of this layer.

FIG. 6 illustrates the case in which an extensible thermoplastic film 27 is placed on the external surface of the self-sealing layer 26 so as to form a self-sealing laminate according to the invention. In this case, the presence of the thermoplastic film 27 mechanically reinforces the self-sealing layer and helps to confine the self-sealing material within the wall 3 of the portion S of the tyre. The material of the self-sealing layer 26 does not pass completely through the crack 36 and there is no plug formation on the outside. Depending on the applications, the types of extensible thermoplastic film may vary, especially their thickness. It should be noted that the thermoplastic film is preferably extensible or stretchable with a very small thickness, and therefore an extensional stiffness which is also very low. It is this which enables it to be remarkably successful in all domestic applications thereof. This very low extensional stiffness enables said film to envelop the puncturing article without reducing the effectiveness of the self-sealing layer and to extend substantially without shrinkage. As a consequence, when the puncturing object is expelled, the extensible thermoplastic film 27 tends to lie within the crack 36 and thus substantially mechanically reinforce the material of the self-sealing layer 26. This penetration is shown schematically in the zone 38. Thus, a true synergy between the two components of the laminate according to the invention is observed.

The thermoplastic film also has the advantage of protecting the external surface from dust. In the case of cycle tyres, this film enables the tyre to be folded in the usual manner without any problem.

The thermoplastic styrene (TPS) elastomers are thermoplastic elastomers in the form of styrene-based block copolymers.

Having an intermediate structure between thermoplastic polymers and elastomers, they consist, as is known, of polystyrene hard blocks linked by elastomer soft blocks, for example polybutadiene, polyisoprene or poly(ethylene-butylene) blocks. They are often triblock elastomers with two hard segments linked by a soft segment. The hard and soft segments may be arranged in a linear fashion, or in a star or branched configuration.

Preferably, the self-sealing layer according to the invention comprises a TPS elastomer chosen from the group consisting of styrene/butadiene/styrene (SBS), styrene/isoprene/styrene (SIS), styrene/isoprene/butadiene/styrene (SIBS), styrene/ethylene-butylene/styrene (SEBS), styrene/ethylene-propylene/styrene (SEPS), styrene/ethylene-ethylene-propylene/styrene (SEEPS) block copolymers and blends of these copolymers.

More preferably, said elastomer is chosen from the group consisting of SEBS copolymers, SEPS copolymers and blends of these copolymers.

According to another preferred embodiment of the invention, the styrene content in the TPS elastomer is between 5 and 50%.

Below the indicated minimum, the thermoplastic nature of the elastomer runs the risk of being substantially reduced, whereas above the recommended maximum the elasticity of the composition may be adversely affected. For these reasons, the styrene content is more preferably between 10 and 40%, in particular between 15 and 35%.

It is preferable for the glass transition temperature ($T_g$, measured according to ASTM D3418) of the TPS elastomer to be below −20° C., more preferably below −40° C.

A $T_g$ value above these minimum temperatures, meaning a higher $T_g$ of the self-sealing composition itself, may reduce the performance of the self-sealing composition when used at very low temperature. For such a use, the $T_g$ of the TPS elastomer is more preferably still below −50° C.

The number-average molecular weight (denoted by $M_n$) of the TPS elastomer is preferably between 50 000 and 500 000 g/mol, more preferably between 75 000 and 450 000 g/mol. Below the minimum values indicated, the cohesion between the TPS elastomer chains, because of its dilution (amount of extender), runs the risk of being degraded. Moreover, an increase in the usage temperature runs the risk of adversely affecting the mechanical properties, especially the properties at break, consequently leading to reduced "hot" performance. Moreover, too high a molecular weight $M_n$ may be detrimental as regards the flexibility of the composition at the recommended extender oil contents. Thus, it has been found that an $M_n$ lying within the 250 000 to 400 000 range was particularly suitable, especially for use of the self-sealing composition in a pneumatic tyre.

The number-average molecular weight ($M_n$) of the TPS elastomer is determined, in a known manner, by SEC (steric exclusion chromatography). The specimen is firstly dissolved in tetrahydrofuran with a concentration of about 1 g/l and then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series, namely a STYRAGEL HMW7 column, a STYRAGEL HMW6E column and two STYRAGEL HT6E columns, is used. The injected volume of the polymer specimen solution is 100 μl. The detector is a WATERS 2410 differential refractometer and its associated software for handling the chromatograph data is the WATERS MILLENIUM system. The calculated average molecular weights are relative to a calibration curve obtained with polystyrene standards.

The TPS elastomer may constitute all of the elastomer matrix or the predominant portion by weight (preferably for more than 50% and more preferably for more than 70%) of the matrix when it includes one or more other elastomers, whether thermoplastic or not, for example elastomers of the diene type.

According to a preferred embodiment, the TPS elastomer is the sole elastomer, and the sole thermoplastic elastomer present in the self-sealing composition.

To obtain dynamic moduli and/or Shore hardnesses in accordance with the invention, the self-sealing layers preferably include extender oils (or plasticizing oils) used at a very high content, greater than 200 phr (i.e. greater than 200 parts by weight per 100 parts of rubber or elastomer).

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins, particularly to tackifying resins, which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

More preferably, a polyisobutene oil, in particular a polyisobutylene (PIB) oil, a paraffinic oil or a mixture of these oils is used.

As examples, polyisobutylene oils are sold in particular by Univar under the name "Dynapak Poly" (e.g. "Dynapak Poly 190"), by BASF under the name "Glissopal" (e.g. "Glissopal 1000") or "Oppanol" (e.g. "Oppanol B12"); paraffinic oils are sold for example by Exxon under the name "Telura 618" or by Repsol under the name "Extensol 51".

The number-average molecular weight ($M_n$) of the extender oil is preferably between 200 and 30 000 g/mol, more preferably still between 300 and 10 000 g/mol.

For excessively low $M_n$ values, there is a risk of the oil migrating to the outside of the self-sealing composition, whereas excessively high $M_n$ values may result in this composition becoming too stiff. An $M_n$ value between 400 and 3000 g/mol proves to be an excellent compromise for the intended applications, in particular for use in a pneumatic tyre.

The number-average molecular weight ($M_n$) of the extender oil is determined by SEC, the specimen being firstly dissolved in tetrahydrofuran with a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 μl. The detector is a WATERS 2410 differential refractometer and its associated software for handling the chromatograph data is the WATERS MILLENIUM system. The calculated average molecular weights are relative to a calibration curve obtained with polystyrene standards.

A person skilled in the art will know, in the light of the description and the embodiments that follow, how to adjust the quantity of extender oil according to the particular usage conditions of the self-sealing layer, in particular according to the tyre type in which it is intended to be used.

It is preferable for the extender oil content to be between 500 and 900 phr. Below the indicated minimum, the self-sealing composition runs the risk of having too high a rigidity for certain applications, whereas above the recommended maximum there is a risk of the composition having insufficient cohesion.

TPS elastomers, such as SEPS or SEBS, extended with high levels of oils, are well known and commercially available. As examples, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), and those sold by Multibase under the name "Multiflex" (e.g. "Multiflex G00").

These products, developed in particular for medical, pharmaceutical or cosmetic applications, may be processed conventionally in respect of TPEs by extrusion or moulding, for example starting from a raw material available in bead or granule form.

The tyre 1 of FIG. 1 provided with its self-sealing layer 11 as described above may be produced before or after vulcanization.

In the first case (i.e., before vulcanization of the tyre), the self-sealing composition is simply applied in a conventional manner at the desired place, so as to form the layer 11. The vulcanization is then carried out conventionally. TPS elastomers are well able to withstand the stresses associated with the vulcanization step.

An advantageous manufacturing variant for those skilled in the tyre art would consist for example in depositing the self-sealing layer flat, directly on a tyre-building drum, in the form of a skim with a suitable thickness (for example 3 mm), before the latter is covered with the airtight layer and then the rest of the structure of the tyre.

In the second case (i.e., after vulcanization of the tyre), the self-sealing layer is applied to the inside of the cured pneumatic tyre by any suitable means, for example by bonding, by spraying or by extrusion or blow-moulding of a film of suitable thickness. The fact of applying the self-sealing product hot has the advantage of improving the strength of the bond between the self-sealing layer and the inner wall of the tyre. This inner wall may or may not be cleaned, depending on the case.

If necessary, the thermoplastic film may be applied to the self-sealing layer after vulcanization when this film has too low a softening temperature to withstand the vulcanization. The very great flexibility of the film and its extensibility make this application easy. In addition, these films may have a tack that further facilitates this application.

The application of a self-sealing laminate according to the invention on the inner wall of a cycle tyre will now be described in conjunction with FIGS. 7 to 14. As emphasized in the cited U.S. Pat. No. 4,424,295, it is very difficult to deposit, after vulcanization, a layer of self-sealing product on the inside of a cycle tyre because of the very great flexibility of this type of tyre. The method according to the invention makes it possible for such an application to be easily carried out.

FIG. 7 illustrates the first step of the method of application according to the invention, for applying a self-sealing laminate to a cycle tyre. This tyre 20 comprises, in particular, two sidewalls 21 and a tread 24, and has an inner wall 28 and an outer wall 29. The first step consists in turning the tyre inside out so that the inner wall 28 is on the outside of the tyre and the outer wall 29 on the inside. The turning-inside-out operation may be carried out in the direction indicated by the arrows shown in FIG. 7.

This turning-inside-out operation is very easy in the case of a cycle tyre because of the very great flexibility of the bead wires, which can be easily folded. This turning-inside-out operation may be carried out manually.

FIG. 8 shows the tyre 20 turned inside-out.

Next, the inside-out tyre 20 is placed on an inflation drum 50 (illustrated schematically in FIG. 9) having two flanges 51 and 52 designed to accommodate the beads 23 of the tyre and a membrane 53 intended to seal the cavity 54 formed by the drum, the flanges and the membrane.

Figure 10:
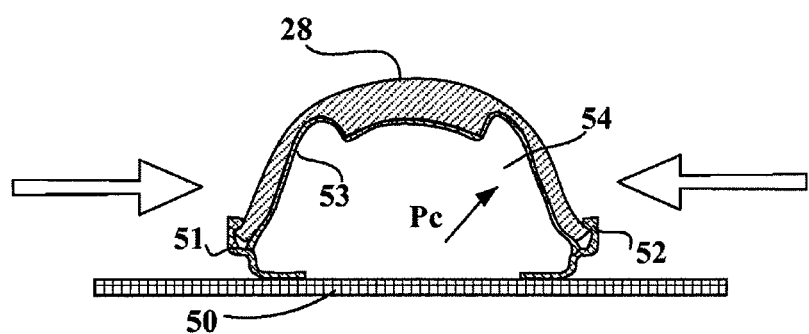
FIG. 10 shows the phase of inflating the inside-out tyre.

The cavity 54 is then inflated, while bringing the two flanges 51 and 52 closer together, as illustrated in FIG. 10. The internal pressure $P_c$ of the cavity 54 presses the membrane 53 against the outer wall 29 of the tyre. The two arrows of FIG. 10 show the direction of the movement bringing the two flanges 51, 52 closer together.

Figure 11:
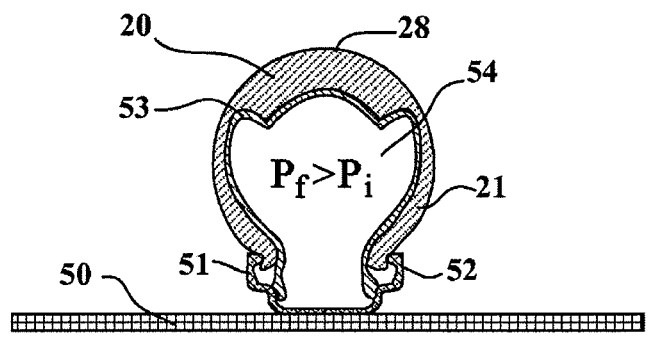
FIG. 11 shows the inflated inside-out cycle tyre.

In FIG. 11, the movement of bringing the two flanges 51 and 52 closer together is completed and the internal pressure in the cavity 54 is raised to a value $P_f$. This pressure $P_f$ is between 0.5 and 3 times the nominal inflation pressure $P_i$ of the tyre. Preferably, this pressure is substantially greater than the nominal inflation pressure of the tyre 20 so as to bring the carcass reinforcement of the tyre 20 to a state of extension greater than that normally undergone in service by the tyre.

This inflation pressure $P_f$ also has the advantage of giving the tyre 20 thus mounted inside-out an overall stiffness quite sufficient for being able to apply the self-sealing laminate 25 to the inner wall 28.

Just before the laminate 25 is applied, it is possible to carry out a cleaning operation on the tyre. This cleaning operation may be simple removal of dust, by brushing it, or may use water, alcohol or any other substance and method that are appropriate.

Figure 12:
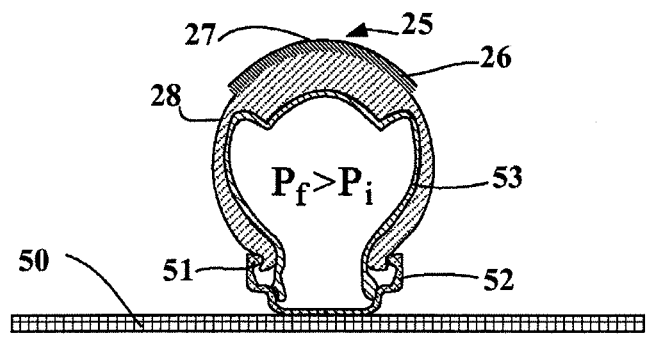
FIG. 12 shows the application of the self-sealing layer.

FIG. 12 shows the tyre 20 with a laminate 25 deposited on its inner wall 28. This laminate may have been produced beforehand by extrusion of a skim, to the to desired width and thickness, and by deposition onto a protective film for example a siliconized film, and wound in reels. During application to the tyre, a layer of the skim is wound around the tyre, stripping off the siliconized protective film during application of the skim and rotating the tyre. The thermoplastic film 27 is then applied.

Preferably, the thermoplastic film 27 is applied to the free wall of the skim before winding, in such a way that a reel of laminate is wound, ready for application to the tyre 20, this application taking place in a single operation.

The self-sealing layer may also be applied by winding a strip of thickness and width that are smaller than the desired dimensions.

Finally, the self-sealing material 26 may be extruded directly onto the inner wall 28 of the tyre and then the thermoplastic film 27 wound thereonto.

Figure 13:
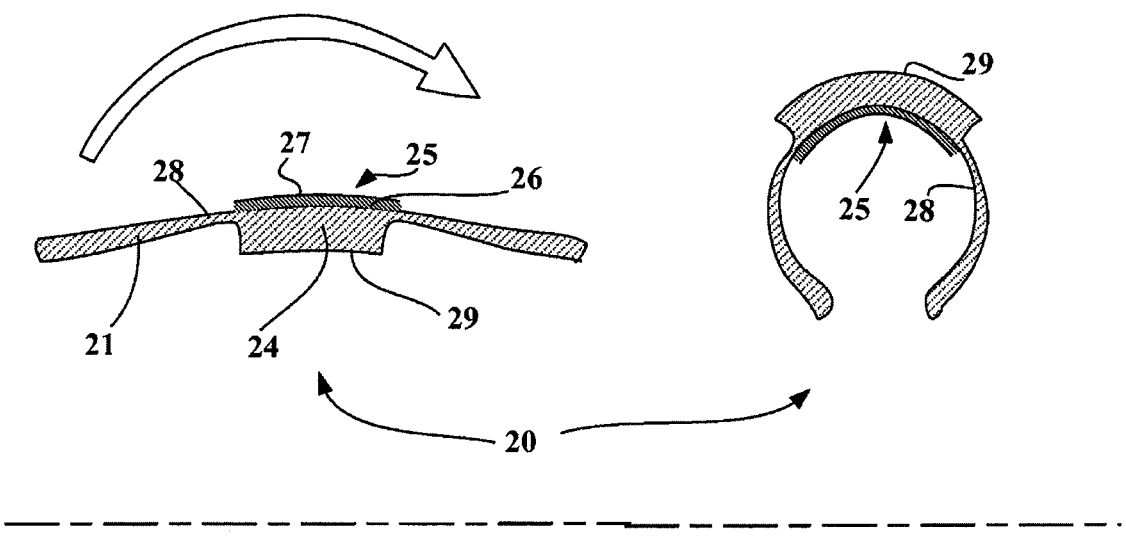
FIG. 13 shows the tyre of FIG. 12 being brought back the right way round.
Figure 14:
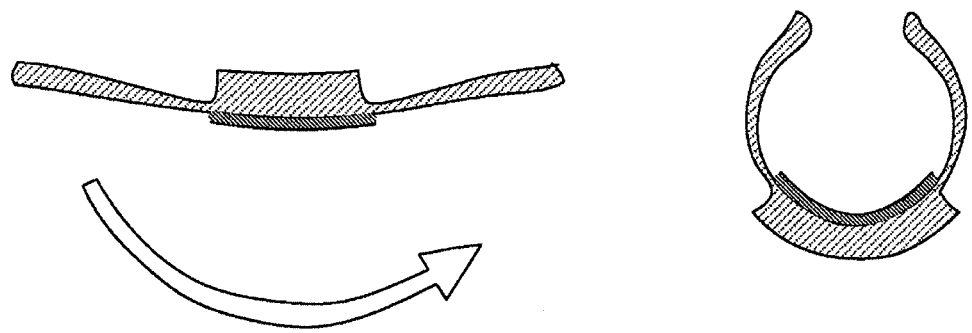
FIG. 14 shows the tyre of FIG. 13 brought back the right way round.

After the laminate 25 has been applied, the tyre is turned back the right way round, by a second turning-inside-out operation, as illustrated in FIG. 13. The tyre illustrated in FIG. 14 is then obtained.

It should be noted that the self-sealing layer 26 of the laminate 25, placed without any particular stress on the inner wall 28 of the inside-out tyre, inflated to $P_f$, is, after the turning-inside-out operation, in a state of compression linked to the taking-up of the normal shape of the tyre 20 and to the deflation of the cavity 54. This state of compression must be maintained when the tyre 20 is inflated to its nominal inflation pressure, since application took place with a pressure in the cavity 54 above this nominal inflation pressure $P_i$. This state of compression is very favourable to the effectiveness of the self-sealing layer 26 and the self-sealing laminate 25. When the nominal inflation pressure $P_i$ is 2 bar, the applied pressure may be up to 6 bar.

An exemplary embodiment of the invention was produced for cycle tyres of 52-559 size. A 1 mm thick layer of the self-sealing material, consisting of an SEBS elastomer (15% Kraton G1654 product) matrix and a polyisobutylene (PIB) oil of 1000 $M_n$ (85% Dynapack 190), was deposited on the inner wall of these tyres. A polyethylene stretch film 35 μm in thickness was also applied. The weight of the laminate was around 100 g, the Shore 0 hardness of this material was around 8 and its dynamic modulus G* was less than 10 000 Pa at 60° C.

These tyres were punctured with 1.8 mm diameter nails, with various other sharp points and objects causing damage (for example, puncturing drill bits 2 mm in diameter). The pressure was monitored for 5 days. We found a zero leak for 3 perforations with 1.8 mm nails (i.e. a pressure drop equivalent to that of the tyre before puncturing). The leaks produced using the other objects were slight and compatible with cycle-type use.

The invention is not limited to the examples described and shown, and various modifications may be applied thereto without departing from its scope defined by the appended claims.

The invention claimed is:

1. A tubeless tyre having a shape of a torus open radially inwards, the tyre comprising:
   an outer wall;
   an inner wall; and
   a self-sealing layer covering at least part of the inner wall, the self-sealing layer including a thermoplastic styrene (TPS) elastomer having a dynamic modulus G* of less than 0.01 MPa, the dynamic modulus G* being measured at a frequency of 10 Hz and a temperature of 60° C.

2. The tyre according to claim 1, wherein the self-sealing layer has a Shore 0 hardness of less than 35.

3. The tyre according to claim 1, wherein the Shore 0 hardness of the self-sealing layer is less than 20.

4. The tyre according to claim 3, wherein the Shore 0 hardness of the self-sealing layer is less than 10.

5. The tyre according to claim 1, wherein, on a side facing an internal cavity of the tyre, the self-sealing layer is covered with a film.

6. The tyre according to claim 5, wherein the film is an extensible thermoplastic film chosen from a group that includes a polypropylene (PP) film, a polyethylene (PE) film, a polyvinyl chloride (PVC) film, and a polyvinylidene chloride (PVDC) film.

7. The tyre according to claim 5,
   wherein the film is an extensible thermoplastic film, and
   wherein, if a puncture hole occurs in the inner wall, the thermoplastic film is sufficiently extensible to extend into the puncture hole when the tyre is inflated to an operating inflation pressure.

8. The tyre according to claim 7, wherein a thickness of the thermoplastic film is less than 100 μm.

9. The tyre according to claim 8, wherein the thickness of the thermoplastic film is between 5 μm and 50 μm.

10. The tyre according to claim 1, wherein the TPS is a predominant elastomer of the self-sealing layer.

11. The tyre according to claim 1, wherein the TPS elastomer is chosen from a group of block copolymers that includes any one of styrene/butadiene/styrene (SBS), styrene/isoprene/styrene (SIS), styrene/isoprene/butadiene/styrene (SIBS), styrene/ethylene-butylene/styrene (SEBS), styrene/ethylene-propylene/styrene (SEPS), styrene/ethylene-ethylene-propylene/styrene (SEEPS), and blends of these copolymers.

12. The tyre according to claim 11, wherein the TPS elastomer is chosen from a group of copolymers that includes SEBS copolymers, SEPS copolymers, and blends of these copolymers.

13. The tyre according to claim 1, wherein the self-sealing layer includes an extender oil in an amount greater than 200 phr (parts by weight per hundred parts of rubber or elastomer).

14. The tyre according to claim 1, further comprising an air-tight layer that includes a rubber composition substantially air-tight to an inflation gas and substantially covering an entirety of the inner wall of the tyre, wherein the self-sealing layer at least partly covers the air-tight layer on a side facing an internal cavity of the tyre.

15. The tyre according to claim 1, wherein the self-sealing layer is positioned at a crown of the tyre.

16. The tyre according to claim 1, wherein the tyre is suitable for a cycle.

17. The tyre according to claim 16, wherein a thickness of the self-sealing layer is between 0.6 and 1.5 mm.

18. The tyre according to claim 17, wherein the thickness of the self-sealing layer is between 0.8 and 1.2 mm.

* * * * *